US006968568B1

(12) United States Patent
Hilpert, Jr. et al.

(10) Patent No.: US 6,968,568 B1
(45) Date of Patent: Nov. 22, 2005

(54) METHODS AND APPARATUS OF DISSEMINATING BROADCAST INFORMATION TO A HANDHELD DEVICE

(75) Inventors: Edwin James Hilpert, Jr., Round Rock, TX (US); Michael Joseph Sullivan, Austin, TX (US); William J. Tracey, Round Rock, TX (US); Jonathan Mark Wagner, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/467,418

(22) Filed: Dec. 20, 1999

(51) Int. Cl.[7] .............................................. H04N 7/173
(52) U.S. Cl. ........................... 725/90; 725/93; 725/98; 725/109; 725/118; 725/141; 725/153
(58) Field of Search ............................. 725/54, 30, 33, 725/146, 88, 92, 93, 145, 91, 109, 89, 90, 725/133, 141, 153; 348/699–701; 707/501.01, 707/102, 104, 501.1; 715/501.1; 709/204–207, 709/217–219, 231, 236

(56) References Cited

U.S. PATENT DOCUMENTS

| 4,750,151 A | | 6/1988 | Baus ........................... 364/900 |
| 4,973,952 A | | 11/1990 | Malec et al. ............ 340/825.35 |
| 5,250,789 A | | 10/1993 | Johnsen ........................ 235/383 |
| 5,606,359 A | * | 2/1997 | Youden et al. ................. 725/88 |
| 5,630,068 A | | 5/1997 | Vela et al. ..................... 395/201 |
| 5,821,512 A | | 10/1998 | O'Hagan et al. ............ 235/383 |
| 5,821,513 A | | 10/1998 | O'Hagan et al. ............ 235/383 |
| 5,847,750 A | * | 12/1998 | Srivastava et al. ........... 725/102 |
| 5,880,449 A | | 3/1999 | Teicher et al. ............... 235/383 |
| 5,887,243 A | | 3/1999 | Harvey et al. ................ 455/3.1 |
| 5,918,211 A | | 6/1999 | Sloane ........................ 705/16 |
| 6,047,317 A | * | 4/2000 | Bisdikian et al. ............ 725/142 |
| 6,230,162 B1 | * | 5/2001 | Kumar et al. ............. 707/104.1 |
| 6,356,921 B1 | * | 3/2002 | Kumar et al. ............. 715/501.1 |
| 6,357,042 B2 | * | 3/2002 | Srinivasan et al. ............ 725/32 |
| 6,496,228 B1 | * | 12/2002 | McGee et al. ............... 348/700 |
| 6,553,178 B2 | * | 4/2003 | Abecassis ..................... 386/83 |
| 6,622,004 B1 | * | 9/2003 | Sonoda et al. .............. 455/3.05 |

FOREIGN PATENT DOCUMENTS

JP 08-056350 2/1996

(Continued)

*Primary Examiner*—Kieu-Oanh Bui
(74) *Attorney, Agent, or Firm*—Marilyn Smith Dawkins; Dillon & Yudell LLP

(57) ABSTRACT

Broadcast information is classified in categories to facilitate user selection and filtration of the broadcast information which is processed for presentation to the user. The broadcast information is transmitted in the form of a meta frame and one or more category frames which are repeated in a continuous cycle. Meta frames and category frames are distinguished and identified by major and minor codes following a frame starting delimiter. The meta frame contains a description of each of the available categories, together with an identification of respective category major and minor codes, the frequency on which the respective category frame is transmitted if multiple frequencies are employed, and the relative position of the respective category frame within transmission cycle. If multiple frequencies are employed, the meta frame may be repeatedly broadcast on a base frequency while subsets of the category frames are transmitted on different frequencies, or the meta and category frames may be repeated in sequence on all frequencies but with varying offsets. Upon user selection of a category, the category information within the meta frame is employed to construct or key a filter for the broadcast information. The selected category frame data is received and added to a local database, formatted, and presented to the user.

21 Claims, 4 Drawing Sheets

FOREIGN PATENT DOCUMENTS

| | | |
|---|---|---|
| JP | 09-008751 | 1/1997 |
| JP | 09-009216 | 1/1997 |
| JP | 01-190150 | 7/1997 |
| JP | 10-248050 | 9/1998 |
| JP | 11-017676 | 1/1999 |
| JP | 11-205764 | 7/1999 |
| JP | 11-239305 | 8/1999 |
| JP | 2000-068952 | 3/2000 |
| JP | 2001-008176 | 1/2001 |
| JP | 2001-134225 | 5/2001 |

* cited by examiner

| MetaFrame | Category 1 | Category 2 | ... | Category n | MetaFrame | Category 1 |

Figure 2A

| | | | | |
|---|---|---|---|---|
| f0 | MetaFrame | MetaFrame | MetaFrame | MetaFrame |
| f1 | Category 1 | Category 1 | Category 1 | Category 1 |
| f2 | Category 2 | Category 2 | Category 2 | Category 2 |
| ... | Category 3 | Category 3 | Category 3 | Category 3 |
| fn | Category n | Category n | Category n | Category n |

Figure 2B

| | | | | | | |
|---|---|---|---|---|---|---|
| f0 | MetaFrame | MetaFrame | MetaFrame | ... | MetaFrame | MetaFrame | MetaFrame |
| f1 | Category 1 | Category 2 | Category 3 | ... | Category n | Category 1 | Category 2 |
| f2 | Category 2 | Category 3 | ... | ... | Category 1 | Category 2 | Category 3 |
| ... | | | | | | | |
| fn | Category n | Category 1 | Category 2 | ... | Category 3 | Category n | Category 1 |

Figure 2C

METHODS AND APPARATUS OF DISSEMINATING BROADCAST INFORMATION TO A HANDHELD DEVICE

BACKGROUND OF THE INVENTION

1. Technical Field

The present invention generally relates to user controlled selection and filtration of broadcast information for viewing and in particular to user selection of serially broadcast information which repeatedly cycles. Still more particularly, the present invention relates to employing meta frames allowing a user to select and filter frames from a series of frames which are serially broadcast in a continuous cycle.

2. Description of the Related Art

Contemporary real-time dissemination of information to large numbers of recipients generally occurs through radio and television broadcasts. The content and timing of the information is typically at the discretion of the broadcaster, with the recipients only having the option of selecting a particular channel. With the advent of "Webcasting," or broadcasting real-time on the Internet, and particularly with the increase of wireless devices, such a handheld organizers and mobile telephones, which are capable of providing mobile access to the Internet, user selection and/or filtration of the broadcast information received and presented to the user in a manner not requiring the use of "channels"—either real (e.g., frequency-based) or virtual (e.g., different addresses) channels—is necessary in light of market demands for user control over selection of the content which the user views.

Excluding, momentarily, broadcast of information intended purely for entertainment, a variety of circumstances arise where dissemination of information to a broad range of users would benefit from user filtration of received data. For example, a user entering a grocery store with a handheld device may receive, from a localized transmitter operated by the store, information regarding the store and the items which the grocery store sells. The broadcast information may be, for instance, the content of the grocery store's Web site, the pages of which are repeatedly, serially broadcast. The pages may include, for example, a page providing search capabilities on the shelf location, price, and nutritional information of items which the store sells. The user may wish to view only that search page in order to retrieve data relevant to item(s) in which she is interested, or only information regarding a specified list of items and any special discounts which the grocery store may currently offer.

The data received by the handheld device in this example is in an architected format readily retrievable for consumption by the user in a preferred form (e.g., display, audio playback, etc.). However, wireless handheld devices currently introduce a number of limitations which must be overcome, including: capability to receive only low-bandwidth transmissions; limited storage; varying capabilities among devices (Palm Pilot, Win CE, etc.); and low processor speed. Additionally, broadcast of information to multiple recipients over shared transmission media does not generally permit customization of broadcast content to individual users or communication of requests from the user(s) to the broadcast device.

It would be desirable, therefore, to enable a user to select from information serially broadcast in continuous cycles for viewing.

SUMMARY OF THE INVENTION

It is therefore one object of the present invention to provide a method, system, and computer program product for user controlled selection and filtration of broadcast information for viewing.

It is another object of the present invention to provide a method, system, and computer program product for user selection of serially broadcast information which repeatedly cycles.

It is yet another object of the present invention to provide a method, system, and computer program product for employing meta frames allowing a user to select and filter frames from a series of frames which are serially broadcast in a continuous cycle.

The foregoing objects are achieved as is now described. Broadcast information is classified in categories to facilitate user selection and filtration of the broadcast information which is processed for presentation to the user. The broadcast information is transmitted in the form of a meta frame and one or more category frames which are repeated in a continuous cycle. Meta frames and category frames are distinguished and identified by major and minor codes following a frame starting delimiter. The meta frame contains a description of each of the available categories, together with an identification of respective category major and minor codes, the frequency on which the respective category frame is transmitted if multiple frequencies are employed, and the relative position of the respective category frame within transmission cycle. If multiple frequencies are employed, the meta frame may be repeatedly broadcast on a base frequency while subsets of the category frames are transmitted on different frequencies, or the meta and category frames may be repeated in sequence on all frequencies but with varying offsets. Upon user selection of a category, the category information within the meta frame is employed to construct or key a filter for the broadcast information. The selected category frame data is received and added to a local database, formatted, and presented to the user.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 2A–2C are diagrams of a format for broadcasting information to wireless devices in a manner enabling users to selectively filter the broadcast information so that only user-selected portions of the broadcast information are presented to the user by a receiving device in accordance with a preferred embodiment of the present invention.

DETAILED DESCRIPTION OF THE PREFERRED EMBODIMENT

Figure 1:
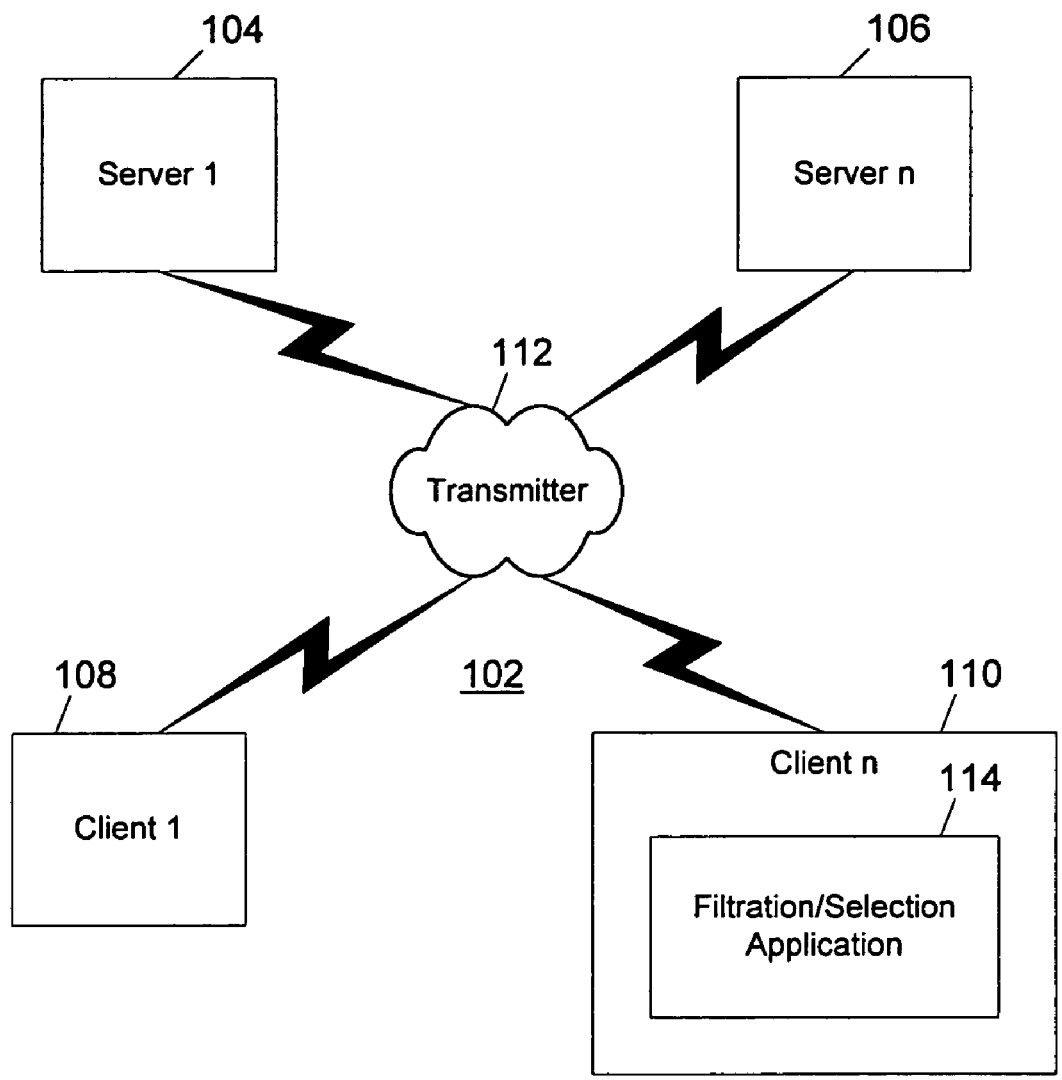
FIG. 1 depicts a data processing system network in which a preferred embodiment of the present invention may be implemented.

With reference now to the figures, and in particular with reference to FIG. 1, a data processing system network in which a preferred embodiment of the present invention may be implemented is depicted. Data processing system network 102 includes one or more servers 104–106 and one or more clients 108–110. Servers 104–106 and clients 108–110 exchange data, such as HyperText Transmission Protocol (HTTP) requests and responses or HyperText Markup Language (HTML) data and accompanying graphical image or sound data, through the Transmitter 112 in accordance with the known art, utilizing, for example, the Transmission Control Protocol/Internet Protocol (TCP/IP) for data transfers.

One or more clients within data processing system network 102, such as client 110, may be a wireless device such as a mobile telephone or a handheld organizer capable of receiving data on one or more defined frequencies in a predetermined format. Data from a server 104 to client 110 may be transmitted over conventional wireless networks connected to Transmitter 112 or from a localized transmitter coupled directly to server 104 and transmitting with a set range covering, for example, space occupied by an enterprise. In either case, existing wireless communication protocols and devices may be adapted for broadcast and reception of data in the manner described herein.

Wireless device or client 110 receives information broadcast on a predefined frequency or band by server 104 includes an application 114 enabling the user to selectively filter the broadcast information which is received. The selective filtration enables the wireless device or client 110 to display, play, or otherwise present to the user only user-selected portions of the broadcast information. The application 114 may be a browser application with the functionality described herein.

Referring to FIGS. 2A through 2C, diagrams of a format for broadcasting information to wireless devices in a manner enabling users to selectively filter the broadcast information so that only user-selected portions of the broadcast information are presented to the user by a receiving device in accordance with a preferred embodiment of the present invention are illustrated. In the present invention, broadcast data continuously cycles, with either periodic or intermittent updates. FIG. 2A illustrates the basic broadcast format contemplated, which includes within each cycle a master meta frame and a number of category frames.

The master meta frame recurs at fixed intervals within each cycle, and contains information describing the format and timing of other frames within the cycle:

Starting Delimiter
Major Code
Minor Code
Cycle Time
Category 1
  Category Name
  Category Major Code
  [Category Minor Code]
  Category Frequency/Relative Cycle Position
Category 2
  Category Name
  Category Major Code
  [Category Minor Code]
  Category Frequency/Relative Cycle Position
. . .
Category n
  Category Name
  Category Major Code
  [Category Minor Code]
  Category Frequency/Relative Cycle Position
Frequency 1 Start Time
Frequency 2 Start Time
. . .
Frequency n Start Time
CRC
Ending Delimiter The Major and Minor Codes immediately following the Starting Delimiter identify the frame as a meta frame. The Cycle Time indicates the length of time required to repeat a full cycle, which may vary with the number of category frames within a cycle. Each category frame 1 through n within the cycle is identified within the meta frame by name and major code (and optionally by Category Minor Code). If multiple frequencies are utilized, the frequency of the category frame is identified within the meta frame. The relative cycle position of the category frame within the cycle is also identified. Where multiple frequencies are employed, the start time for each frequency is specified. An error checking code such as a cyclic redundancy check (CRC) character may also be included within the meta frame. The format described is merely exemplary, intended to illustrate the types of information which should be included within a meta frame.

Category frames contain data, and may be preindexed to accelerate database access on the client. A suitable format for category frames is:

Starting Delimiter
Major Code
Minor Code
Sequence Number
Device Capabilities
Data
CRC
Ending Delimiter The Major and Minor Codes within category frames allow the identity of the category frame as specified within the meta frame to be verified. The Sequence Number may be employed to replace out-of-date content for the category frame. For example, if the content of a category frame is updated, the Sequence Number within that category frame would be incremented to indicate to the receiving device not to utilize cached copies of the category frame, but to receive and utilize the updated version of the entry for its database. The Device Capabilities code specifies requirements of the frame such as color vs. grayscale, speech support, WinCE vs. Palm OS, etc. The same content tailored to different device capabilities in discrete category frames. The Data for a category frame is preferably transmitted in an architected encoding such as HTML which allows the client to generically decode and utilize the information.

In operation, the meta frame within each broadcast cycle is employed by the handheld device to present available categories to the user. When the user selects a category of interest, the information regarding that category is employed to create a reception filter within the handheld device. The reception filter may simply be keyed, for a selected category, to the Major and/or Minor Codes of the category frame for the selected category. Frequency and timing information for the desired category frame may also be employed as part of the filter. Once the filter is created or keyed to the selected category, the handheld device monitors monitors the broadcast frequency or frequencies to receive and process frames carrying the matching category major (and, optionally, minor) code. The received frames are stored in a data base on the handheld device for further parsing and presentation to the user.

In cases where a large amount of item data for a category needs to be broadcast, broadcast of the cycles of meta and category frames described above may need to be conducted across several frequencies in order to achieve the bandwidth necessary for acceptable throughput. It is envisioned that the meta frame record for each category will contain information on the different frequencies employed for broadcast, together with the relative position of category frames within each frequency broadcast cycle containing frames within the respective category. Two possible configurations for utilizing frequency/timing to achieve broadband throughput, illustrated in FIGS. 2B and 2C.

In FIG. 2B, the meta frames are transmitted repeatedly on the base frequency f0, while the category frames are broadcast on extended frequencies f1 through fn. A specific frequency may be employed for a category or a subset of categories. After the user creates a filter identifying a desired category, the handheld device alters the monitored frequency to listen for frames of the selected category. A given frequency f1 or fn may be utilized to transmit only category frames for one category, repeated continuously. Alternatively, a particular frequency f2 may be employed to transmit frame for multiple categories in succession, with the sequence repeated continuously. The base frequency f0 need not be reserved for the meta frames, but may also include interspersed category frames. Preferably, however, each frequency should contain a unique subset of categories, which will then cycle more quickly and result in better data update latencies. The optimal allocation of meta and category frames to different frequencies may be determined at the time the content to be broadcast is specified, encoded within the meta frame, and dynamically updated as the broadcast content is altered.

In FIG. 2C, the same content is broadcast on all frequencies, but with varying offsets in timing. Each frequency will thus repeat cycles containing all meta and category frames, but in a manner staggered with respect to time and specified within the meta frame for each category. The handheld device may then utilize this information, along with clocking information in the meta frame, to determine which frequency to jump to in order to achieve the shortest delay before receiving the selected category information. Alternatively, a combination of the configurations of FIGS. 2B and 2C may be employed. For example, meta frames may be only broadcast on a base frequency f0 and all category frames may be broadcast in staggered fashion on extended frequencies f1 through fn.

Figure 3:
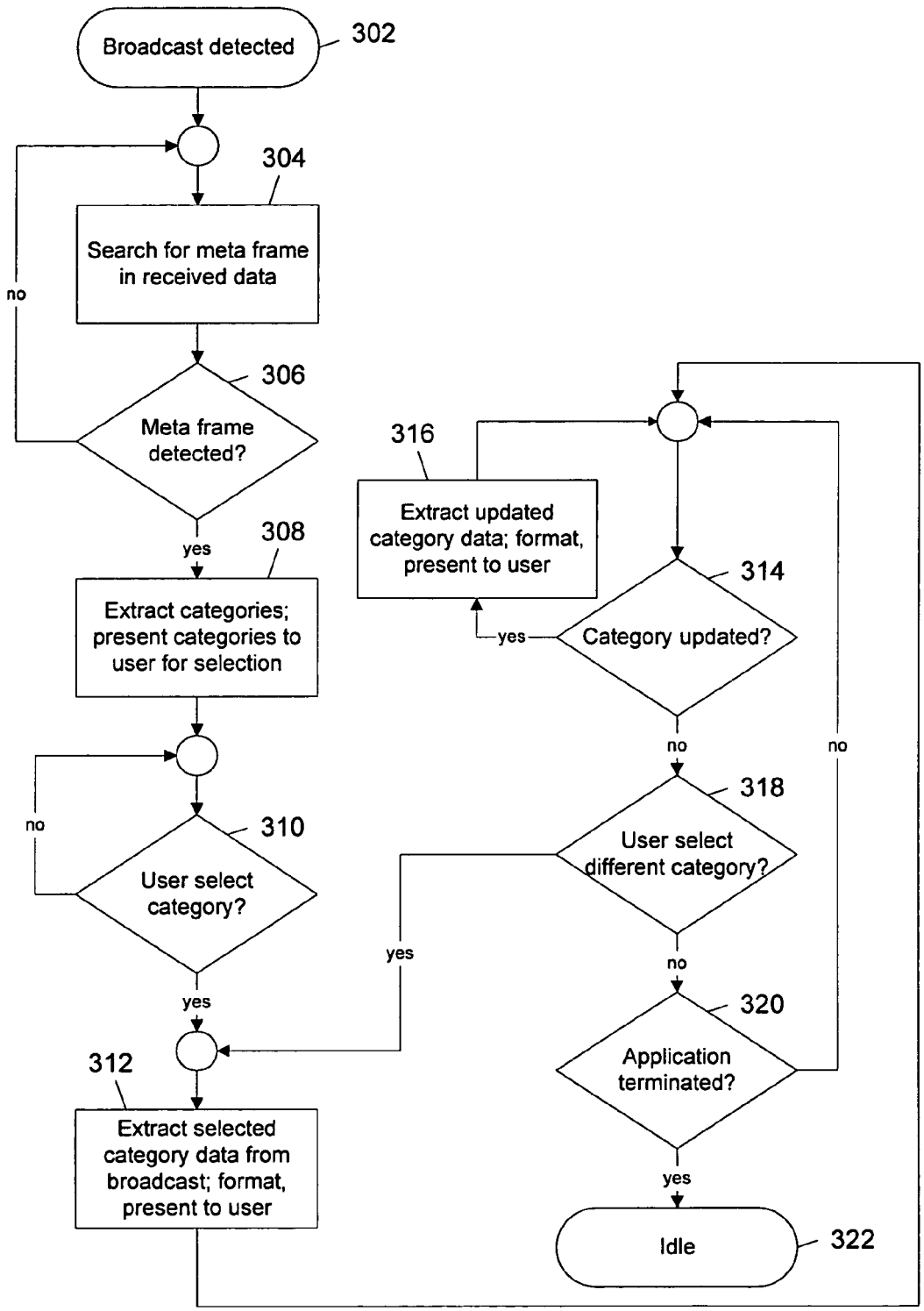
FIG. 3 depicts a high level flowchart for a process of selectively filtering continuously cycled broadcast information for presentation to a user in accordance with a preferred embodiment of the present invention.

With reference now to FIG. 3, a high level flowchart for a process of selectively filtering continuously cycled broadcast information for presentation to a user in accordance with a preferred embodiment of the present invention is depicted. The process begins at step 302, which depicts detection of broadcast information for presentation on a handheld device. The process first passes to step 304, which illustrates searching for a meta frame within the broadcast data, identifying the meta frame by the major and minor codes. The process then passes to step 306, which depicts determining whether the meta frame has been detected. If not, the process returns to step 304 to continuing watching for the meta frame. If so, however, the process proceeds instead to step 308, which illustrates extracting the category information from the meta frame and presenting the available categories to the user for selection.

The process passes next to step 310, which depicts a determination of whether the user has selected a category for presentation. If not, the process remains at step 310 awaiting user selection of the categories available for display. If so, however, the process proceeds instead to step 312, which illustrates extracting the selected category data, identified by the major and minor codes for the category selected by the user, from the broadcast data being received. Frequency hopping to a specified frequency bearing the selected category data, or bearing the selected category data at an offset closest to the user selection of the data. The selected category data, once received, is added to the locally stored database, formatted for presentation to the user, and presented to the user, either by graphic display, audio playback, video playback, or some combination of all three.

Display of selected category may, optionally, include monitoring the broadcast data for updates to the selected category data, identified by the sequence number of the category frame received. If update monitoring is enabled, the process proceeds next to step 314, which depicts monitoring the broadcast information for an update to the selected category frame. If an updated category frame is detected, the process proceeds to step 316, which illustrates extracting the updated category frame from the broadcast, updating the contents for the category within the database, formatting the extracted category frame for presentation to the user, and updating the display or other presentation device. In this manner, the present invention may be employed for real-time broadcasts (music, videos, etc.) with user selection of the content viewed or listened to from various alternatives.

If the update monitoring option has not been enabled, or if the category frame has not been updated since last extracted and presented to the user, the process proceeds instead to step 318, which illustrates a determination of whether another category has been selected by the user. The available categories specified within the meta frame may be displayed to the user on the handheld device together with the content of the selected category frame, enabling the user to select a different category at any time. The categories displayed may be updated with any changes to the contents of the meta frame. If the user selects a different category, the process returns to step 312, and extracts the category frame for the newly-selected category from the broadcast, adding the new category frame to handheld device's database, and formatting and presenting the new category data to the user.

If the user has not selected a new category, however, the process proceeds instead to step 320, which depicts a determination of whether the application executing within the handheld device which receives broadcast information has been terminated. If not, the process returns to step 314 (if enabled) or 316, to determine if an update to the category frame has been received or if the user has selected a different category. If so, however, the process proceeds to step 322, which illustrates the process becoming idle until the application is restarted and another broadcast is detected. The category frames extracted from the broadcast may be discarded.

The present invention may be employed to enable user selection of information from a content server despite the inability to support client-server type requests from the receiving device. Content may be distributed among a number of users by broadcasting on a common frequency or band, or transmission on other common media. The present invention is well suited to selective filtration and receipt of information in handheld devices having low bandwidth reception capabilities, limited storage, low processor speed, and varying capabilities or devices. Additionally, the present invention lends itself to the offering of pay-per-view services. It is conceivable that the user may purchase a "key" (e.g., encryption key, frequency specifier, etc.) enabling access to the broadcast information. The software could require this key or code prior to receiving the broadcast data, with the key being changed at some predetermined interval.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of disseminating information, comprising:
   forming one or more category frames containing data for user-selectable categories;
   forming a meta frame identifying the user-selectable categories corresponding to the one or more category frames;
   transmitting broadcast information including the meta frame and the one or more category frames in sequence on a common transmission media shared by a plurality of users;
   transmitting the meta frame in repetitive succession in one or more continuous cycles on a first frequency; and
   transmitting subsets of the one more category frames in repetitive succession in one or more other frequencies, wherein a unique subset of the one or more category frames is transmitted on each of said one or more other frequencies and not on the first frequency.

2. The method of claim 1, further comprising:
   responsive to receiving the meta frame and the one or more category frames at a device employed by one of the plurality of users, extracting category information from the meta frame and presenting the user-selectable categories to the user.

3. The method of claim 2, further comprising:
   responsive to selection of a user-selectable category by the user,
   receiving a category frame corresponding to the user-selectable category from the one or more category frames,
   formatting data within the category frame for presentation to the user, and
   presenting the data from the category frame to the user utilizing the device.

4. The method of claim 1, wherein the step of forming one or more category frames containing data for user-selectable categories further comprises:
   forming each category frame with a starting delimiter identifying a start of the respective category frame, a major code identifying a category to which the respective category frame belongs, encoded data for the respective category frame, and an ending delimiter for the respective category frame.

5. The method of claim 1, wherein the step of forming a meta frame identifying the user-selectable categories corresponding to the one or more category frames further comprises:
   forming the meta frame with a starting delimiter identifying a start of the meta frame,
   a major code identifying the meta frame, for each category corresponding to one of the one or more category frames,
   a category name for the respective category,
   a major code identifying the respective category to which the one of the one or more category frames belongs,
   position information specifying a position of the one of the one or more category frames within the broadcast information, and
   an ending delimiter identifying an end of the meta frame.

6. The method of claim 1, wherein the step of transmitting the meta frame and the one or more category frames in repetitive succession in one or more continuous cycles on one or more frequencies further comprises:
   transmitting the meta frame and the one or more category frames in repetitive succession in a single continuous cycle on a single frequency.

7. The method of claim 1, wherein the step of transmitting the meta frame and the one or more category frames in repetitive succession in one or more continuous cycles on one or more frequencies further comprises:
   transmitting the meta frame and the one or more category frames in repetitive succession in a single continuous cycle on each of a plurality of frequencies at different offsets, wherein a different frame from the meta frame and the one or more category frames is transmitted at a given time on each frequency within the plurality of frequencies.

8. A system of disseminating information, comprising:
   means for forming one or more category frames containing data for user-selectable categories;
   means for forming a meta frame identifying the user-selectable categories corresponding to the one or more category frames;
   means for transmitting broadcast information including the meta frame and the one or more category frames in sequence on a common transmission media shared by a plurality of users
   means for transmitting the meta frame in repetitive succession in one or more continuous cycles on a first frequency; and
   means for transmitting subsets of the one more category frames in repetitive succession in one or more other frequencies wherein a unique subset of the one or more category frames is transmitted on each of said one or more other frequencies and not on the first frequency.

9. The system of claim 8, further comprising:
   means, responsive to receiving the meta frame and the one or more category frames at a device employed by one of the plurality of users, for extracting category information from the meta frame and presenting the user-selectable categories to the user.

10. The system of claim 9, further comprising:
    means, responsive to selection of a user-selectable category by the user, for receiving a category frame corresponding to the user-selectable category from the one or more category frames,
    formatting data within the category frame for presentation to the user, and presenting the data from the category frame to the user utilizing the device.

11. The system of claim 8, wherein the means for forming one or more category frames containing data for user-selectable categories further comprises:
means for forming each category frame with a starting delimiter identifying a start of the respective category frame, a major code identifying a category to which the respective category frame belongs, encoded data for the respective category frame, and an ending delimiter for the respective category frame.

12. The system of claim 8, wherein the means for forming a meta frame identifying the user-selectable categories corresponding to the one or more category frames further comprises:
means for forming the meta frame with a starting delimiter identifying a start of the meta frame, a major code identifying the meta frame,
for each category corresponding to one of the one or more category frames,
a category name for the respective category,
a major code identifying the respective category to which the one of the one or more category frames belongs,
position information specifying a position of the one of the one or more category frames within the broadcast information, and
an ending delimiter identifying an end of the meta frame.

13. The system of claim 10, wherein the means for transmitting the meta frame and the one or more category frames in repetitive succession in one or more continuous cycles on one or more frequencies further comprises:
means for transmitting the meta frame and the one or more category frames in repetitive succession in a single continuous cycle on a single frequency.

14. The system of claim 10, wherein the means for transmitting the meta frame and the one or more category frames in repetitive succession in one or more continuous cycles on one or more frequencies further comprises:
means for transmitting the meta frame and the one or more category frames in repetitive succession in a single continuous cycle on each of a plurality of frequencies at different offsets, wherein a different frame from the meta frame and the one or more category frames is transmitted at a given time on each frequency within the plurality of frequencies.

15. A computer program product within a computer usable medium for disseminating information, comprising:
instructions for forming one or more category frames containing data for user-selectable categories;
instructions for forming a meta frame identifying the user-selectable categories corresponding to the one or more category frames;
instructions for transmitting broadcast information including the meta frame and the one or more category frames in sequence on a common transmission media shared by a plurality of users;
instructions for transmitting the meta frame in repetitive succession in one or more continuous cycles on a first frequency; and
instructions for transmitting subsets of the one more category frames in repetitive succession in one or more other frequencies, wherein a unique subset of the one or more category frames is transmitted on each of said one or more other frequencies and not on the first frequency.

16. The computer program product of claim 15, further comprising:
instructions, responsive to receiving the meta frame and the one or more category frames at a device employed by one of the plurality of users, for extracting category information from the meta frame and presenting the user-selectable categories to the user.

17. The computer program product of claim 16, further comprising:
instructions, responsive to selection of a user-selectable category by the user, for receiving a category frame corresponding to the user-selectable category from the one or more category frames,
formatting data within the category frame for presentation to the user, and
presenting the data from the category frame to the user utilizing the device.

18. The computer program product of claim 15, wherein the instructions for forming one or more category frames containing data for user-selectable categories further comprise:
instructions for forming each category frame with a starting delimiter identifying a start of the respective category frame, a major code identifying a category to which the respective category frame belongs, encoded data for the respective category frame, and an ending delimiter for the respective category frame.

19. The computer program product of claim 15, wherein the instructions for forming a meta frame identifying the user-selectable categories corresponding to the one or more category frames further comprise:
instructions for forming the meta frame with a starting delimiter identifying a start of the meta frame,
a major code identifying the meta frame, for each category corresponding to one of the one or more category frames,
a category name for the respective category,
a major code identifying the respective category to which the one of the one or more category frames belongs,
position information specifying a position of the one of the one or more category frames within the broadcast information, and
an ending delimiter identifying an end of the meta frame.

20. The computer program product of claim 19, wherein the instructions for transmitting the meta frame and the one or more category frames in repetitive succession in one or more continuous cycles on one or more frequencies further comprise:
instructions for transmitting the meta frame and the one or more category frames in repetitive succession in a single continuous cycle on a single frequency.

21. The computer program product of claim 19, wherein the instructions for transmitting the meta frame and the one or more category frames in repetitive succession in one or more continuous cycles on one or more frequencies further comprise:
instructions for transmitting the meta frame and the one or more category frames in repetitive succession in a single continuous cycle on each of a plurality of frequencies at different offsets, wherein a different frame from the meta frame and the one or more category frames is transmitted at a given time on each frequency within the plurality of frequencies.

* * * * *